US007788535B2

(12) United States Patent
Bussa et al.

(10) Patent No.: US 7,788,535 B2
(45) Date of Patent: Aug. 31, 2010

(54) MEANS AND METHOD FOR DEBUGGING

(75) Inventors: Nagaraju Bussa, Hyderabad (IN);
Narendranath Udupa, Bangalore (IN);
Sainath Karlapalem, Bangalore (IN)

(73) Assignee: NXP B.V., Eindhoven (NL)

( * ) Notice: Subject to any disclaimer, the term of this patent is extended or adjusted under 35 U.S.C. 154(b) by 40 days.

(21) Appl. No.: 11/815,099

(22) PCT Filed: Jan. 23, 2006

(86) PCT No.: PCT/IB2006/050235

§ 371 (c)(1),
(2), (4) Date: May 6, 2009

(87) PCT Pub. No.: WO2006/079962

PCT Pub. Date: Aug. 3, 2006

(65) Prior Publication Data

US 2009/0217095 A1    Aug. 27, 2009

(30) Foreign Application Priority Data

Jan. 28, 2005    (EP)    ................................. 05100584

(51) Int. Cl.
*G06F 11/00*    (2006.01)
(52) U.S. Cl. ................................ 714/34; 714/35; 714/38
(58) Field of Classification Search .................... 714/34
See application file for complete search history.

(56) References Cited

U.S. PATENT DOCUMENTS 4,748,556 A    5/1988    Hoeren et al.
5,704,034 A *  12/1997   Circello ........................ 714/38
5,737,516 A *  4/1998    Circello et al. ................ 714/38
5,812,850 A    9/1998    Wimble
5,903,718 A *  5/1999    Marik ........................... 714/38
6,035,422 A *  3/2000    Hohl et al. ..................... 714/35
6,314,530 B1* 11/2001    Mann ............................ 714/38
6,757,846 B1   6/2004    Murray et al.
2005/0034024 A1* 2/2005  Alverson et al. .............. 714/38

FOREIGN PATENT DOCUMENTS

EP    0762278 A1    3/1997

OTHER PUBLICATIONS

Tucker, K. "Debugging Highly-Optimized ADA With Code Motion (DHACM)" Annual International Conference on ADA. Proceedings of the Conference on TRI-ADA '97, 1997, pp. 197-203.

* cited by examiner

*Primary Examiner*—Scott T Baderman
*Assistant Examiner*—Kamini Patel

(57) ABSTRACT

A data processing system is provided comprising at least one processing unit (PU) for data processing and a debugger means (DM) for debugging the processing of the at least one processing unit (PU) based on a plurality of breakpoints. The debugger means (DM) comprises a first register (BAR) for storing a base address for one of the plurality of breakpoints, wherein the debugging means (DM) initiates the debugging of the processing of the at least one processing units (PU) based on the base address stored in the first breakpoint register, i.e. the base address register. A second breakpoint register (OR) is provided for storing an offset for obtaining subsequent breakpoints. A logic arithmetic unit (LAU) is provided for repetitively calculating a breakpoint condition based on the base address stored in the first breakpoint register and the offset stored in the second breakpoint register and for updating the base address stored in the first breakpoint register.

4 Claims, 1 Drawing Sheet

MEANS AND METHOD FOR DEBUGGING

Figure 1:
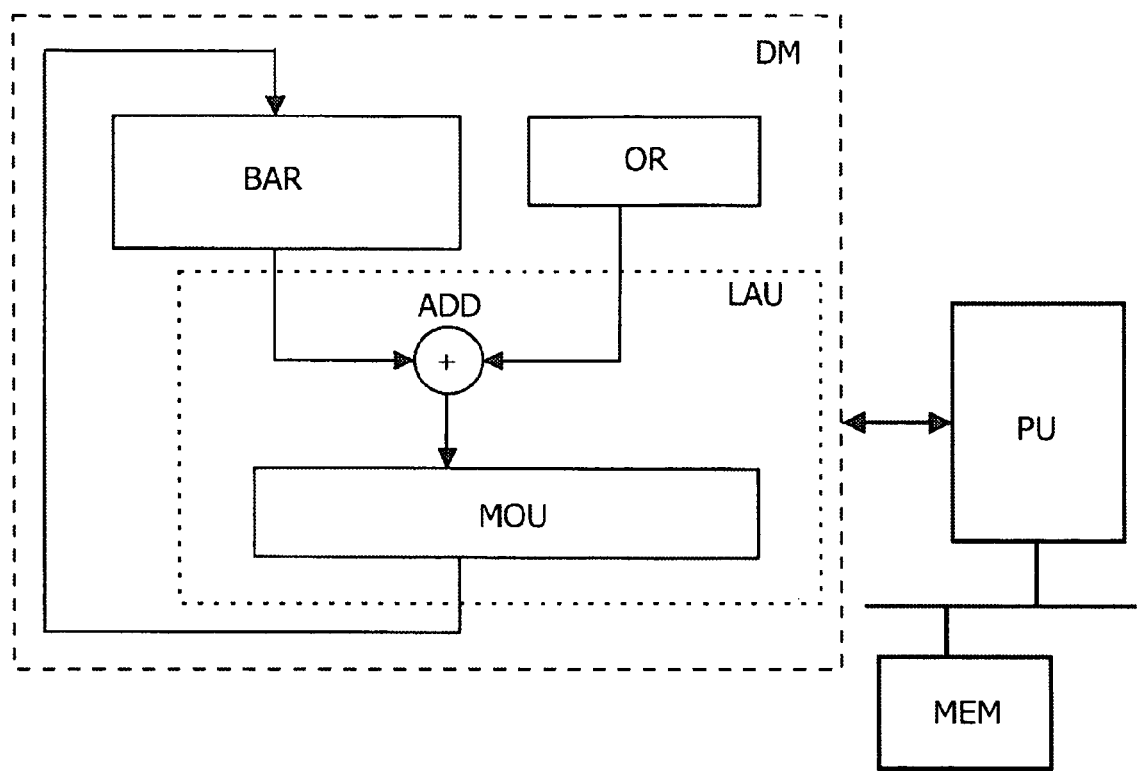

The present invention relates to a data processing system comprising a plurality of processing unit and a debugging means as well as to a method for debugging in a data processing system.

With modern system-on-chip (SoC) based on a multi-core architecture, the development time is greatly influenced by the time used for debugging the overall system. Therefore, an improved debugging capability of the system-on-chip will lead to a reduced development time. Also, possible bugs in the complex application will be easier to find and therefore less time consuming. Currently, in order to deal with the debugging requirement, breakpoint registers are included into the overall architecture. A breakpoint can be considered as a location in a program at which the execution thereof is stopped and the control of the executing processor is switched to a debugger. Typically the debugger stops the execution of the program depending on the type of the breakpoint. Accordingly, the execution can be stopped if a specific line has been reached, if a specific memory location is written to or read from, if a specific condition is reached or the like. In hardware, these breakpoints can be embodied as breakpoint registers for data as well as instructions. These breakpoint registers can be programmed with the necessary data, address or instruction to set an appropriate breakpoint. If the program is started and is executed, the debugger serves to generate a trap when the system execution encounters the breakpoint. Thereafter, the state of the processor resource may be watched and analyzed in order to encounter the possible cause for the bug or any other significant event. In other words, the debugger will indicate an occurrence of a first order event corresponding to the programmed breakpoint, e.g. a match between the programmed data breakpoint register and the data content of a data bus.

U.S. Pat. No. 6,757,846 relates to a method for multi-bus breakpoint stepping. A breakpoint unit is provided which is capable of detecting bus events on multiple busses. The breakpoint unit originally is programmed to break on a detection of a specified bus event on a bus selected from multiple buses. Once the specified bus event is detected the device goes into one of several possible frozen states. Then the breakpoint unit needs to be re-programmed manually to detect a new bus event, which in many cases is undesirable.

U.S. Pat. No. 6,192,427 discloses a data processing device which uses a portion of a RAM as an input buffer for a stream of data which is currently being processed by the data processing device. The RAM is divided into a region for data and a further region for breakpoints. Based on the data in the first region, the second region will be loaded with the necessary addresses. A software routine selects the address from the second region and places it in the breakpoint register. A comparator will decide firing of a breakpoint whenever the address match occurs. The major drawbacks of this approach are one, the need to identify the necessary addresses/events by carrying out static analysis and store them in advance, and two, the physical limitation of the memory, which can house the breakpoint addresses.

Within media or streaming processing the number of instructions for a specific task is limited and often repetitive which introduce additional problems during the debugging of such a system-on-chip. For debugging purposes it may therefore be desirable to observe a repetitive instruction repeating itself every x instructions by inserting breakpoints and to analyze states of the overall system after the instruction has been executed every time. Additionally it may be desirable for debugging purposes to observe whether and how a set of data is accessed which is stored in different address locations at different instances. Enabling the firing of breakpoints for multiple data addresses or instruction addresses can be carried out by manually re-programming the breakpoint registers with the new addresses and/or values after a first breakpoint has been hit. However, this will require a considerable amount of time for debugging. On the other hand, a sequence of breakpoints can be programmed statically to a plurality of breakpoint registers which will not require any re-programming but it will require too many breakpoint registers which is either not feasible to realize or at best resulting in a cost-intensive solution.

It is therefore an object of the invention to provide a data processing system as well as a method for debugging which are capable of self-updating the breakpoint registers in order to accommodate a large set of predefined breakpoints.

This object is solved by a data processing system according to claim 1, a method for debugging according to claim 3 as well as an electronic device according to claim 4.

Therefore, a data processing system is provided comprising at least one processing unit for data processing and a debugger means for debugging the processing of the at least one processing unit based on a plurality of breakpoints. The debugger means comprises a first breakpoint register for storing a base address for one of the plurality of breakpoints, wherein the debugging means initiates the debugging of the processing of the at least one processing units based on the base address stored in the first breakpoint register, i.e. the base address register. A second breakpoint register is provided for storing an offset for obtaining subsequent breakpoints. A logic arithmetic unit is provided for repetitively calculating a breakpoint condition based on the base address stored in the first breakpoint register and the offset stored in the second breakpoint register and for updating the base address stored in the first breakpoint register.

Accordingly, the occurrences of repeated instructions/data is detected without the need for manually re-programming the breakpoint registers with new addresses and/or values after the occurrence of a breakpoint. Moreover, as breakpoint registers are re-used very few breakpoint registers are sufficient for accommodating all user-defined breakpoints, leading to a cheaper implementation of the debugging infrastructure.

According to an aspect of the invention the data processing system further comprising a memory and an application running on the processing system having its FIFO mapped on to the memory. The logic arithmetic unit comprises an adder for adding the content of the first and second breakpoint register, and a modulo operation unit for performing a modulo operation on the output of the adder with the size of the FIFO, wherein the result of the modulo operation represents the next base address to be updated in the first breakpoint register.

The invention also relates to a method of debugging within a data processing system having at least one processing unit for data processing. The processing of the at least one processing unit is detected based on a plurality of breakpoints. A base address for one of the plurality of breakpoints is stored, wherein the debugging of the processing of the at least one processing units is initiated based on the stored base address. An offset for a breakpoint is stored. A subsequent breakpoint condition is repetitively detected based on the stored base address and the stored offset, and the stored base address is updated accordingly.

The invention further relates to an electronic device comprising at least one processing unit for data processing and a debugger means for debugging the processing of the at least one processing unit based on a plurality of breakpoints. The debugger means comprises a first breakpoint register for storing a base address for one of the plurality of breakpoints, wherein the debugging means initiates the debugging of the processing of the at least one processing units based on the base address stored in the first breakpoint register, i.e. the base address register. A second breakpoint register is provided for storing an offset for obtaining subsequent breakpoints. A logic arithmetic unit is provided for repetitively calculating a breakpoint condition based on the base address stored in the first breakpoint register and the offset stored in the second breakpoint register and for updating the base address stored in the first breakpoint register accordingly.

The invention is based on the idea to perform an automatic updating of breakpoint registers within a data processing environment with repetitive processing. A rule for the occurrence of hardware breakpoints is determined off-line or beforehand, i.e. for which conditions a processing in the data processing system should be stopped for debugging purposes. This rule is modeled into a base address and an offset corresponding to the repetitive pattern of the repetitive occurrences. A logic unit is used to control the updating of the breakpoint registers to determine or generate the next or newer hardware breakpoint condition.

These and other aspects of the invention are apparent from and will be elucidated with reference to the embodiments described hereinafter.

Figure 2:
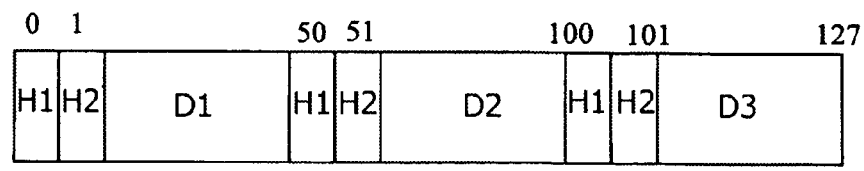

FIG. 1 shows a block diagram of a debugging means within a data processing system according to the first embodiment, and FIG. 2 shows a representation of a FIFO containing data according to a second embodiment.

The architecture of the data processing system according to a first embodiment relate to a system-on-chip in particular for media or streaming processing on multi-core architecture. At least some of the communication within the system-on-chip is preferably FIFO based, i.e. FIFOs (e.g. mapped to a shared memory) are used to store multiple data packets. For debugging purposes a repetitive instruction repeating itself every x instructions is observed and states of the overall system after the execution of the instruction are analyzed. Additionally, the debugging can be performed to observe whether and how a set of data is accessed which is stored in different address location at different instances.

FIG. 1 shows a block diagram of a debugging means DM within a data processing system having a plurality of processing units PU (only one processing unit is shown) according to a first embodiment. The debugging means DM comprises a base address register BAR, an offset register OR and a logic arithmetic unit LAU. The base address register BAR is used to store a base address for instructions and/or data addresses. The offset register OR is used to store an offset to the base address stored in the base address register BAR. The logic arithmetic unit LAU comprises an adder ADD for adding the addresses stored in the base address register BAR and the offset register OR, and a modulo operation unit MOU. The logic arithmetic unit LAU serves to detect a breakpoint condition and to update the base address register BAR, subsequently using the offset register OR for determining a new subsequent breakpoint.

The debugging means DM allows the usage of several hardware breakpoints in order to detect a specific instruction and/or data based on merely the base address register BAR and the offset register OR with the logic arithmetic unit LAU. The base address register BAR is used to program the address of the first occurrence of the respective instruction and/or data. The offset register OR is used to program the offset between the base address and the next address with the same instruction and/or data, i.e. the value in the offset register OR corresponds to the pattern of repetition. Hence, two registers are sufficient for the case of a repetitive or cyclic processing.

The first embodiment will now be described on the basis of one way of processing for a Discrete Cosine Transformation (DCT). The DCT task is performed by reading a macroblock packet header, parse the header and read the macroblock data packet based on the parser output, and then computing the DCT coefficients based on the read data and then output the coefficients. Here, as an example the system behavior and the timing of the reading of the macroblock header is examined. Accordingly, a breakpoint may be inserted at the instruction reading the macroblock header. If the instructions have been compiled without any loop unrolling technique then the address of the instruction to read the macroblock header does not change such that the specific address thereof can be stored in an instruction breakpoint register. Hence, as soon as the instruction to read the macroblock header is processed, the processing will break. However, if the compiler does indeed use the loop unrolling technique the addresses of the respective reading instruction do change such that the read instruction may have different addresses according to the degree of loop unrolling. In other words, one specific instruction may have multiple addresses. According to the prior art, a large number of instruction breakpoint registers are required for programming the different addresses of the read instruction within the various loops if the processing of the DCT coefficients has to break whenever the header read instruction occurs. The numbers of required breakpoint registers will depend on the degree of loop unrolling during compile time. Accordingly, the detection of an execution of such an instruction requires extra breakpoint registers resulting in an increased hardware cost.

FIG. 2 shows a representation of a circular buffer or FIFO buffer according to a second embodiment. Here, the principles of the invention are described for self-updating hardware breakpoints to detect the occurrence of specific data. The second embodiment is based on the same architecture and principles as the first embodiment. The FIFO buffer typically has a size in bytes, which is a power of two, i.e. 64, 128, 256 etc. On the other hand the data packet size of the processing may be any size such that the size of the FIFO is not necessarily an integer multiple of the size of the packet. The FIFO according to FIG. 2 has a size of 128 bytes while the data packet size is 50 bytes. The first two bytes of the data packet belong to the header section H1, H2. A first and a second data packet D1, D2 and part of third data packet D3 can be accommodated within one FIFO. The breakpoints are to be inserted when the header H1, H2 is accessed in order to analyze the state of the system. As the header H1, H2 occur at locations 0 and 1; 50 and 51; 100 and 101 etc the usage of break point registers according to the prior art is very tedious. It should be noted that these numbers and size are merely cited for illustrating and not limiting the embodiment.

However, according to the second embodiment the detection of the access to the headers H1, H2 is performed using the base address register BAR, the offset register OR, and the logic arithmetic unit LAU according to FIG. 1. Here, the base address register BAR is initially set to 0 and the offset register OR is set to 50, i.e. representing the data packet size and therefore the pattern of repetition of the header. Then the modulo operation is performed by the modulo operation unit MOU on the sum of the addresses from the base address register BAR and the offset register OR (as added by the adder ADD) with the size of the FIFO. The output thereof is used to update the base address register BAR. Due to the size of the data packets D1, D2, D3 and the size of the FIFO, the subsequent addresses can fall into the modulo of the sum of the base address and the offset with the size of the FIFO. However, the principles of the invention can also be applied to a FIFO with a size that corresponds to the exact integer multiple of the size of the data packet.

According to a third embodiment of the invention the principles of the invention and the architecture according to FIG. 1 can be applied to instruction breakpoints. Here, the content of the base address register BAR will be added with the content of the offset register OR like a circular counter by logic arithmetic unit LAU according to the degree of loop unrolling. As an example the degree of loop unrolling is considered as 4. The base address stored in the base address register BAR is 0x100 and the offset is 0x20. Subsequent base addresses are 0x100+0x20, 0x120+0x20, 0x140+0x20, 0x160+0x20→0x100 and so on. Therefore, breakpoints occur when the instructions at 0x100, 0x120, 0x140, and 0x160 are executed. The debugging methods according to the prior art require 4 breakpoint registers for the debugging. However the debugger according to the third embodiment merely require the base address register BAR, the offset register OR and the logic arithmetic unit LAU to compute the subsequent addresses of the same instruction based on the offset. The updated address is stored in the base address register BAR and is therefore set as breakpoint.

The debugger means DM according to the invention is in particular advantageous for a higher degree of loop unrolling as usually found in media or streaming application as the number of the required registers will be independent of the loop unrolling.

Although the first, second and third embodiments have been described with reference to the logic arithmetic unit LAU comprising a modulo operation unit MOU and an adder ADD, the logic arithmetic unit LAU may also be realized by a first and second logic arithmetic operation. The updated base address register BAR will correspond to a second logic arithmetic operation on the result of a first logic arithmetic operation of the base address register BAR and the offset register OR.

The above-described principles of the invention may also be implemented by an electronic device instead of a data processing system.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim in numerating several means, several of these means can be embodied by one and the same item of hardware. The mere fact that certain measures are resided in mutually different dependent claims does not indicate that a combination of these measures cannot be used to advantage.

Furthermore, any reference signs in the claims shall not be constitute as limiting the scope of the claims.

The invention claimed is:

1. Data processing system, comprising:
   at least one processing unit (PU) for processing an application; and
   a debugger means (DM) for debugging the processing of the at least one processing unit (PU) based on a plurality of breakpoints, the debugger means (DM) comprising:
   a first breakpoint register (BAR) for storing a base address for one of the plurality of breakpoints, wherein the debugging means (DM) initiates the debugging of the processing of the at least one processing units (PU) based on the address stored in the base address register (BAR),
   a second breakpoint register (OR) for storing an offset from a base address for a breakpoint,
   logic arithmetic unit (LAU) for repetitively detecting a breakpoint condition based on the base address stored in the first breakpoint register (BAR) and the offset stored in the second breakpoint register (OR) and for updating the base address stored in the first breakpoint register (BAR) accordingly.

2. Data processing system according to claim 1, further comprising a memory (MEM) acting as a FIFO with a pre-defined size being associated to the application processed by the at least one processing unit (PU), wherein the logic arithmetic unit (LAU) comprises an adder (ADD) for adding the content of the first and second breakpoint registers (BAR, OR), and a modulo operation unit (MOU) for performing a modulo operation on the output of the adder (ADD) with the pre-defined size of the FIFO, wherein the result of the modulo operation corresponds to the next base address to be updated in the first breakpoint register (BAR).

3. Method for debugging in a data processing system having at least one processing unit (PU) for processing an application, comprising the steps of:
   debugging the processing of the at least one processing unit (PU) based on a plurality of breakpoints,
   storing a base address for one of the plurality of breakpoints, wherein the debugging of the processing of the at least one processing units (PU) is initiated based on the stored base address,
   storing an offset for a breakpoint,
   repetitively detecting a subsequent breakpoint condition based on the stored base address and the stored offset and logic arithmetic operations, and
   updating the stored base address accordingly.

4. Electronic device, comprising:
   at least one processing unit (PU) for processing an application; and
   a debugger means (DM) for debugging the processing of the at least one processing unit (PU) based on a plurality of breakpoints, the debugger means (DM) comprising:
   a first breakpoint register (BAR) for storing a base address for one of the plurality of breakpoints, wherein the debugging means (DM) initiates the debugging of the processing of the at least one processing units (PU) based on the address stored in the base address register (BAR),
   a second breakpoint register (OR) for storing an offset from a base address for a breakpoint,
   logic arithmetic unit (LAU) for repetitively detecting a breakpoint condition based on the base address stored in the first breakpoint register (BAR) and the offset stored in the second breakpoint register (OR) and for updating the base address stored in the first breakpoint register (BAR) accordingly.

* * * * *